United States Patent [19]

Hayden

[11] 4,373,934

[45] Feb. 15, 1983

[54] METAL BONDED DIAMOND AGGREGATE ABRASIVE

[75] Inventor: Stephen C. Hayden, Columbus, Ohio

[73] Assignee: General Electric Company, Worthington, Ohio

[21] Appl. No.: 290,131

[22] Filed: Aug. 5, 1981

[51] Int. Cl.$^3$ .............................................. B24D 3/02
[52] U.S. Cl. ........................................ 51/309; 51/298
[58] Field of Search ................................. 51/298, 309

[56] References Cited

U.S. PATENT DOCUMENTS

| | | |
|---|---|---|
| Re. 21,165 | 7/1939 | E. Van der Pyl .................. 51/280 |
| 2,216,728 | 10/1940 | Benner et al. .................... 51/280 |
| 2,828,197 | 3/1958 | Blackmer, Jr. .................... 51/309 |
| 3,249,410 | 5/1966 | Lorenzo et al. ................... 51/309 |
| 3,293,012 | 12/1966 | Smiley ............................. 51/309 |
| 3,650,714 | 3/1972 | Farkas ............................. 51/295 |
| 3,795,497 | 3/1974 | Weiss .............................. 51/309 |
| 3,850,590 | 11/1974 | Chalkley et al. .................. 51/309 |
| 3,879,901 | 4/1975 | Caveney ........................... 51/309 |
| 3,955,324 | 5/1976 | Lindstrom ........................ 51/298 |
| 4,024,675 | 5/1977 | Naidich et al. ................... 51/296 |
| 4,142,872 | 3/1979 | Conradi .......................... 51/309 |
| 4,246,006 | 1/1981 | Phaal ............................. 51/309 |

FOREIGN PATENT DOCUMENTS 777153 12/1977 South Africa .

OTHER PUBLICATIONS

Dyer, H. B. & Codey, B. G. "Ultra-Hard Abrasives in Resin Bound Applications", Proc. DWMI Int. Tech. Symposium, 11/15/78.
Tomlinson, P. N., Notter; A. T. & Penny, A. L., CDA-M: A New Dry Grinding Abrasive for Tungsten Carbide, Ind. Diamond Review, 6/78, pp. 204-211.
De Beers, Dry Carbide Grinding Performance Boosted with CDA-M, Ind. Diamond Review, 4/78, p. 122.

Primary Examiner—Donald E. Czaja
Assistant Examiner—W. Thompson
Attorney, Agent, or Firm—Douglas B. Little

[57] ABSTRACT

An improved diamond aggregate abrasive is disclosed comprising milled saw diamond having an average size less than 75 microns held in a silver/copper alloy matrix which also contains a wetting agent for (e.g. titanium). Tests of grinding wheels containing this new aggregate have shown a marked improvement in grinding ratio over commercially available diamond aggregates.

5 Claims, 4 Drawing Figures 4,373,934

METAL BONDED DIAMOND AGGREGATE ABRASIVE

TECHNICAL FIELD

This invention relates to an improved metal bonded agglomerated diamond abrasive whereby the grinding ratio of wheels dry grinding cemented tungsten carbide is significantly improved over standard agglomerated abrasives. The term grinding ratio is the unit volume of workpiece material removed per unit volume of grinding wheel wear.

BACKGROUND

The use of diamond abrasives in metal bonds is well known. U.S. Pat. No. Re. 21,165; U.S. Pat. Nos. 2,737,454; and 2,828,197 disclose abrasive bodies comprising diamond in metal bonds of various copper alloys and bronze bonds.

Metal bonded agglomerated or aggregated abrasives are also well known. U.S. Pat. No. 2,216,728 discloses various forms of metal and glass bonded aggregates. U.S. Pat. No. 3,955,324 teaches the use of a metal/diamond aggregate in which diamond is completely surrounded by metal. U.S. Pat. No. 4,024,675 describes sintered diamond/metal aggregates containing an additive (titanium, zirconium, chromium, vanadium, or silicon) in an amount of 5 to 10 percent of the metal powder. The additive is said to impart the required degree of wettability of the diamond grains with the metal and also cohesion of individual grits to each other.

U.S. Pat. No. 4,246,006 (incorporated herein by reference) discloses copper/silver alloy metal binders used in metal/diamond aggregates which aggregates include a wetting binder as in the '675 patent. The metal alloy employed may be in powdered form for the starting mixture; however, it is preferred that the individual alloy components are used in the starting mixture in order to produce the alloy in situ. The amount of metal alloy powder used in the starting mixture for the aggregate is generally between 40 and 60 weight percent of the total, and the wetting agent is typically between 5 and 15 weight percent of the metal. South African Patent Application No. 77/7153 is similar to U.S. Pat. No. 4,246,006 except sintering is done in a collapsible container.

The diamond used in the aggregates of the '006 patent is selected from one or more of three specific types defined in the patent in terms of Friatest Index, metal content, color, shape, and surface roughness. The Friatest is one of a variety of measures of the strength or friability (i.e. susceptibility to fracture) of the diamond. Typically in such friability tests, a sample of the diamond particles of a particular size is placed in a capsule with a hard steel ball and shaken for a pre-determined period of time. The abrasive particles are then removed from the capsule and screened through the next smaller screen size in relation to the smaller of the two screens used for determining the screen size of the original particles. That is, if 60/80 mesh (250/180 micron) diamond were being tested, the screen used would be the next standard size smaller than 80 mesh or 180 micron. The amount of diamond retained on the screen divided by the weight of the original sample yields a value (toughness index) which indicates the proportion of the diamond which was not broken down to smaller size.

The '006 patent states that it is preferable that the diamond particles used are all fine and have a size smaller than about 125 microns. A powdered mixture of diamond particles and metal is sintered under non-oxidizing conditions, above the liquidus temperature of the metal alloy (typically at a temperature in the range of 700° to 1200° C.) for a time between 10 and 20 minutes. The sintered mass is then cooled to produce an ingot which is crushed and classified to produce the aggregate grits of desired size. The crushing is preferably by a means which reduces the size of the ingot primarily in the shear mode rather than by compression. This is also preferred for the invention described herein. Suitable crushers would be a jaw crusher or a laboratory mill such as the Alpine perplax mill by Alpine American Corp., Natick, Mass.

There is a currently available commercial aggregate diamond grit, CDA-M from DeBeers Industrial Diamond Division of Johannesburg, South Africa. CDA-M particles are relatively coarse, having a size which centers around 80 mesh (180 microns). The much smaller constituent diamond grits are said to cover a broader range of sizes, approximately 140 U.S. mesh (106 microns) and finer. The metal bond alloy used in CDA-M grit is said to account for about 55 weight percent of the whole particle.

The abrasives art recognizes various classes of industrial diamond, the three major classes being resin diamond, metal bond diamond, and saw diamond. Resin bond diamond is suitable for resin bond or vitreous bond grinding wheels and comprises friable, irregular crystals usually coated with nickel alloy or copper. Metal bond diamond is used in metal matrix bonds or plated tools and comprises medium-toughness, regular crystals with a color range from yello-green to light yellow. Crystal inclusions are generally low, but some heavily included crystals can be present. Saw diamond, used in sawing and drilling stone, concrete and refractories, comprises tough (low friability), blocky, cubooctahedral crystals with predominantly smooth faces. The saw diamond crystal is transparent or translucent having a color ranging from light yellow to medium yellow-green. Due to the higher impact strength or toughness of saw diamond, its fracture during sawing operations is minimized and wear occurs largely by abrasion processes.

Saw diamond is generally more blocky in shape (i.e. has a lower aspect ratio) than metal bond or resin bond diamond. Diamond may be classified by shape separation on a shape sorting machine which separates the diamond crystals according to their aspect ratio. Such machines comprise a vibrating inclined table which causes the particle to segregate according to shape, and it collects various fraction of the particles in separate cups or bins. Such machines are well known to the art, and a description may be found in Dyer, H. B., "EMB Natural Diamonds," *Industrial Diamond Review*, (August, 1964) page 192–196.

Metal bonded agglomerated or aggregated diamond abrasives can exhibit higher grinding ratios under certain conditions than nickel or copper coated resin bond type abrasives. It was in an effort to improve upon the aggregates of U.S. Pat. Nos. 4,024,675 and 4,246,006 that this invention was achieved.

DISCLOSURE OF INVENTION

This invention is summarized as:

an improved aggregated abrasive particle comprising diamond particles held in a silver/copper alloy metal bond matrix which contains a wetting agent for diamond, wherein the improvement comprises those aggregates containing diamond:
(a) having a largest dimension which, on the average, is less than 75 microns; and
(b) characterized as milled saw diamond.

The improvement is realized principally through decreasing the average diamond particle size from that used in the standard commercially available agglomerated abrasive. In fact, it is preferred that the average diamond size is 270/325 U.S. mesh (53/45 microns) or less, and all the diamond is preferably under 70 microns.

This smaller size is achieved through milling saw diamond in an apparatus such as a jet mill whereby diamond crystals are accelerated to a high velocity in an air stream and then impact each other and the internal walls of the milling apparatus. The saw diamond raw material which was milled for use in developing this invention was over 20 mesh size (850 microns) predominantly crystal clusters. The milled saw diamond thus obtained does not exhibit the natural crystalline faces of normal saw diamond, and it is less tough (more friable) than metal bond diamond of the same size range. One test has shown the toughness index of milled saw diamond to be about 69 percent of equivalent sized metal bond diamond.

The volume ratio of the diamond to matrix metal powders may be in the range of 1:20 to 4:1, with the range of 2:1 to 4:1 being preferred.

The diamond wetting agent is usually present in an amount of 5 to 15 percent by weight of the total.

BEST MODE FOR CARRYING OUT THE INVENTION

Figure 1:
FIG. 1 is a photomicrograph (magnified 200X) showing one of the improved aggregated diamond abrasive particles of this invention, sample RGA-76E of Example II.
Figure 2:
FIG. 2 is a photomicrograph (magnified by 400X) showing the milled saw diamond raw material used in making these aggregates, which has a particle size less than 75 microns.
Figure 3:
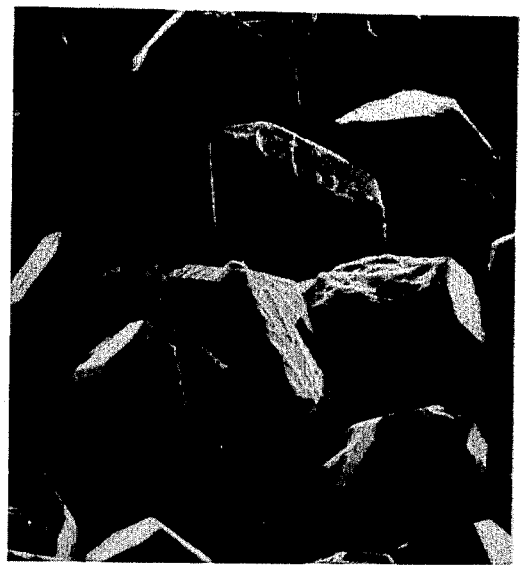
FIG. 3 is a photomicrograph (magnified 400X) which shows metal bond diamond particles, to illustrate the shape and surface difference between metal bond and milled saw diamond.
Figure 4:
FIG. 4 is a photomicrograph (magnified 400X) which shows resin bond diamond particles, in order to illustrate the difference in shape and surface between resin bond and milled saw diamond.

It is preferred that the level of metal matrix (copper/silver alloy and titanium) is the aggregate be about 50–80 percent, more preferably 50–65 percent. However it is to be noted that the percent of matrix metal in the starting mix for making the aggregate is generally lower than the final percent. This is caused by the separation of some diamond from the aggregate during the milling and size separation steps.

As to the aspect ratio for the raw material saw diamond, 4:1 or lower is preferred, with 2:1 or less being more preferred.

It is also preferred to work with a pre-alloyed mixture of copper and silver rather than mixing powders of the two metals and forming the alloy in situ.

Test results during the development of this invention have indicated that the diamond wetting agent (titanium in the experiments) has a large effect on performance. While a minimum of about 5 weight percent titanium was needed to wet the diamond, additionally increasing the titanium amount decreased grinding ratio. The titanium was incorporated into the system both by coating the diamond and by mixing it with the diamond and alloy powders. Techniques for coating diamond with titanium (e.g. sputtering) are known to the art (see e.g. U.S. Pat. Nos. 3,654,110; 3,472,751; 3,325,393; 3,351,543; and 3,650,714).

While the aggregate metal matrix level was not found to significantly affect grinding ratio within experimental error (with the possible exception of a small affect at high titanium concentrations) it was found to affect energy consumption. Increasing the amount of metal (titanium and/or the copper:silver alloy) increased specific energy.

This invention will be further clarified by a consideration of the following examples, which are intended to be purely exemplary. In these examples, grinding tests are described. All the grinding tests have utilized standard 11V-9 flaring cup, resin-bonded grinding wheels, having a diameter of 3¾ inches (92.25 mm) and containing abrasive at a 75 concentration in the resin bond. Methods of making resin bond grinding wheels are well known to the art (see e.g. U.S. Pat. Nos. 3,645,706; 3,385,684; 3,664,819; 3,779,727; and 3,957,461, all of which are incorporated by reference herein). In a typical preparation of a resin bond grinding wheel, a mixture of granulated resin (e.g. phenol-formaldehyde resin), abrasive particles (diamond) and filler is placed in a grinding wheel mold. A molding pressure appropriate to the particular resin—usually several thousand pounds per square inch—is applied, and the mold is heated to a temperature sufficient to make the resin plastically deform (and cure in cases where it is heat curable).

In the grinding wheel art, 100 concentration is conventionally defined as 4.4 carats/cm$^3$ with 1 carat equal to 0.2 g. The concentration of abrasive grit is linearly related to its carat per unit volume concentration. Thus, 75 concentration equals about 3.3 carats of abrasive per cubic centimeter of the grinding wheel abrasive section.

In all the grinding tests, the size of the experimental aggregate used was 250/150 microns. CONTROL 1 was a commercially available aggregate grit, CDA-M, nominally 180 microns. CONTROL 2 was a commercially available nickel coated single crystal diamond grit obtained as RVG-W from the General Electric Company. Control 3 was a commercially copper coated single crystal diamond grit obtained as RVG-D from the General Electric Company.

Also, in the examples which follow: SD designates milled saw diamond; MD designates metal bond diamond; and RD designates resin bond diamond.

EXAMPLE I

A series of grinding test was performed at two standard conditions which are given below.

| Condition | Standard Condition #1 | Standard Condition #2 |
|---|---|---|
| Wheel Speed (Meters/sec.) | 22 | 18 |
| Infeed (mm) | 0.064 | 0.076 |
| Table Speed (M/min) | 1.5 | 1.5 |

-continued

| Condition | Standard Condition #1 | Standard Condition #2 |
|---|---|---|
| Workpiece Material | WC-Co* | WC-Co* |
| Workpiece Size (mm²) (16 pieces) | 6.4 × 19.1 | 6.4 × 19.1 |

*a 6% cobalt cemented tungsten carbide obtained as Carboly 44A cemented carbide from General Electric Company.

All aggregate tested were made from a mixture of 45 weight percent silver:copper alloy and 10 weight percent titanium, the balance being diamond. The resulting weight percent of the matrix after crushing was in the range of 64-68. All the aggregates were fabricated by liquid phase sintering at 920° C. for one hour in argon, followed by crushing and screening.

There were two grinding wheels made of each abrasive. Each test was preceded by a pre-grind until power consumption stabilized. A minimum of four sets of infeeds were run for each wheel, and the grinding ratio and specific energy were recorded for each infeed set. With the exception of CONTROL 2, no consistent significant (95 confidence level) wheel performance differences were detected between the two wheels of each abrasive. The grinding results of the two wheels of each abrasive type combined are summarized in Table 1.

TABLE 1

TABLE 1-continued

|  |  |  | Grinding Ratio | | | |
|---|---|---|---|---|---|---|
|  |  |  | Condition 1 | | Condition 2 | |
|  | Diamond | | | Standard | | Standard |
|  |  | Size | | Devia- | | Devia- |
| Abrasive | Type | (microns) | Mean | tion | Mean | tion |
| CONTROL 1 |  | 106/45 | 135 | 18 | 115 | 27 |
| CONTROL 2 | RD | 106/90 | 21 | 3.8 | 29 | 4.1 |

Analysis of the results shows that, at both Condition 1 and 2, there is a significant performance difference between metal bond and milled saw diamond. Generally the results show that decreasing mesh size increases grinding ratio, and milled saw diamond exhibits greater grinding ratios than metal bond diamond.

EXAMPLE II

Four experimental aggregate abrasives were fabricated by liquid phase sintering in flowing argon for one hour at 960° C. All the aggregates contained feed diamond obtained by milling greater than 20 mesh (850 micron) saw diamond. The resulting sintered 20 gram ingots were initially crushed in a jaw crusher and then milled to final size (250/150 microns) in an Alpine Perplex mill at 3900 rotations per minute using the 2.5 millimeter half-track screen inside the mill. The experimental aggregates are described in Table 2.

TABLE 2

| Aggregate | RGA-76E | RGA-81D | RGA-82B | RGA-82E |
|---|---|---|---|---|
| Mix for Fabrication (weight percent) | | | | |
| AgCu eutectic | 50 | 45 | 45 | 45 |
| Ti powder | 5 | 5 | 5 | 5 |
| Diamond | 45 | 50 | 50 | 50 |
| Diamond PSD** (weight percent) (microns) | | | | |
| 125/106 | — | 7.8 | — | 2.9 |
| 106/90 | — | 18.4 | — | 7.0 |
| 90/75 | — | 49.2 | — | 18.8 |
| 75/63 | — | 24.6 | 7.6 | 14.1 |
| 63/53 | — | — | 13.6 | 8.4 |
| 53/45 | 100 | — | 56.9 | 35.2 |
| 45/38 | — | — | 19.5 | 12.1 |
| <38 | — | — | 2.4 | 1.5 |
| Aggregate Grit | | | | |
| Matrix Level (weight percent) | 78 | 70 | 67 | 70 |
| Density (g/cm³) | 6.2 | 5.9 | 5.6 | 6.0 |

Grinding tests were carried out at the following conditions:

| | |
|---|---|
| Wheel Speed (m/sec.) | 18 |
| Table Speed (mm) | 1.5 |
| Infeed (mm) | 0.050 |
| Workpiece Material | WC-Co* |
| Workpiece Size (mm × mm) | 6.4 × 19.1 × 16 pieces |

*an 8.5% cobalt cemented tungsten carbide (72% WC, 8.0% titanium carbide and 11.5% tantalum carbide) obtained as Carboloy Grade 370 cemented carbide from General Electric Company.
**Particle size distribution.

|  |  |  | Grinding Ratio | | | |
|---|---|---|---|---|---|---|
|  |  |  | Condition 1 | | Condition 2 | |
|  | Diamond | | | Standard | | Standard |
|  |  | Size | | Devia- | | Devia- |
| Abrasive | Type | (microns) | Mean | tion | Mean | tion |
| RGA-63C | MD | 106/90 | 20 | 1.5 | 22 | 2.2 |
| RGA-50B | MD | 75/63 | 26 | 2.2 | 31 | 1.7 |
| RGA-61C | MD | 53/45 | 130 | 47 | 40 | 7.6 |
| RGA-62E | SD | 106/90 | 24 | 2.1 | 28 | 2.4 |
| RGA-59D | SD | 75/63 | 50 | 12 | 48 | 6.2 |
| RGA-50E | SD | 53/45 | 380 | 97 | 86 | 18 |
| RGA-55D | MD | 75/38 | 1.3 | 0.1 | 1.2 | 0.1 |
| RGA-38D | SD | 106/38 | 31 | 1.7 | 41 | 2.7 |

A minimum of four infeed sets were run for each wheel. Two wheels of each type were tested except four wheels containing CONTROLS 1 and 2 were tested.

The results of the grinding tests are summarized in TABLE 3.

TABLE 3

|  | Grinding Ratio | |
|---|---|---|
|  |  | Standard |
| Abrasive | Mean | Deviation |
| CONTROL 2 (106/90 micron) | 15 | 0.9 |
| CONTROL 3 (75/64 micron) | 17 | 0.7 |

TABLE 3-continued

| Abrasive | Grinding Ratio | |
|---|---|---|
| | Mean | Standard Deviation |
| CONTROL 1 (250/150 micron) | 38 | 4.8 |
| RGA-76E (250/150 micron) | 136 | 28 |
| RGA-81D (250/150 micron) | 17 | 0.7 |
| RGA-82B (250/150 micron) | 58 | 8.8 |
| RGA-82E (250/150 micron) | 39 | 4.3 |

The mean column is the average of all infeed sets for all wheels of an abrasive type.

A comparison of the results from TABLES 1 and 3 reveals that the lower titanium concentration (5 percent in TABLE 3 compared to 10% in TABLE 1) has given a benefit in terms of improved grinding ratio over CONTROL 1. In addition, the benefit of using diamond crystals in the aggregate having a largest dimension less than 75 microns on the average is clearly pointed out by a comparison of the grinding ratio of samples RGA-76E and RGA-82B with RGA-81D. The superiority of fine, milled saw diamond raw material for the aggregates is clearly demonstrated. In those preferred cases (RGA-76E and RGA-82B) where the raw material diamond was all below 75 microns in largest dimension, the mean grinding ratio was 1.53 to 3.58 times that obtained with CONTROL 1.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. An improved aggregated abrasive particle comprising diamond particles held in a silver/copper alloy metal bond matrix which contains titanium as a wetting agent for diamond, wherein the improvement comprises those aggregates in which:
    (a) the particle size of the diamonds, on the average, is less than or equal to 53 microns;
    (b) the diamonds are characterized as milled saw diamond; and
    (c) the meta bond matrix comprises 64 to 78 weight percent of the aggregate.

2. The improved aggregated abrasive particle as recited in claim 1 wherein the milled saw diamond has an aspect ratio of less than or equal to 2:1.

3. A resin bond grinding wheel containing the improved aggregated abrasive particles of claim 1.

4. The improved aggregate abrasive particle of claim 1 wherein the volume ratio of diamond to metal matrix is in the range of 2:1 to 4:1.

5. The improved aggregated abrasive particle as recited in claim 1 wherein the wetting agent is titanium present in an amount of about 5 weight percent of the aggregate.

* * * * *